United States Patent Office 3,172,837
Patented Mar. 9, 1965

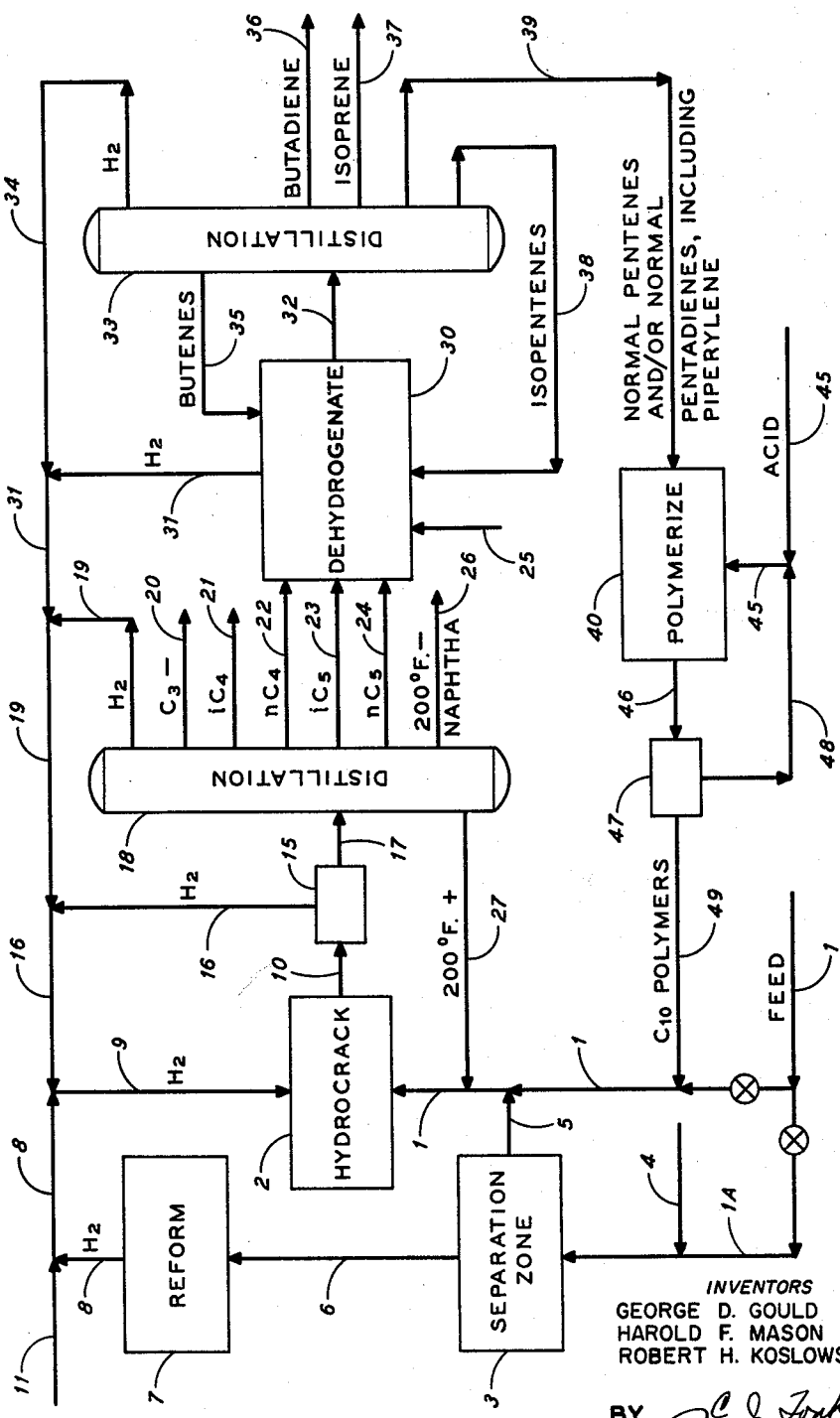

3,172,837
HYDROCARBON CONVERSION PROCESS TO OBTAIN INCREASED AMOUNTS OF ISOPARAFFINS AND DIENES
George D. Gould, Orinda, and Harold F. Mason and Robert H. Kozlowski, Berkeley, Calif., assignors to California Research Corporation, San Francisco, Calif., a corporation of Delaware
Filed Sept. 1, 1961, Ser. No. 135,628
10 Claims. (Cl. 208—60)

Introduction

This invention relates to a hydrocracking process for the production of paraffins and isoparaffins, and to a novel combination of a hydrocracking operation with other process operations to produce dienes.

Objectives

An object of this invention is to provide a destructive hydrogenation process capable of maximizing the production of isoparaffins.

A further object of this invention is to provide a combination of a hydrocracking operation with other processing operations to produce dienes.

The present invention

In accordance with the present invention there is provided, in a hydrocracking process wherein a hydrocarbon distillate feed boiling within the range from about 160° to 1050° F. and hydrogen are contacted in a hydrocracking zone in the presence of a catalyst comprising a hydrogenating-dehydrogenating component on an active cracking support at a temperature from 400° to 900° F., a pressure from 500 to 3500 p.s.i.g., preferably 1000 to 2000 p.s.i.g., and a liquid hourly space velocity from 0.1 to 15 to produce paraffins and isoparaffins, the method of increasing the yield of said paraffins and isoparaffins which comprises selecting said feed from the group consisting of paraffinic raffinates and petroleum distillates containing at least 75 volume percent paraffins, said raffinates being further selected from raffinates from Udex extraction, $SO_2$ extraction, furfural extraction, molecular sieve separation, and silica gel separation processes, and recycling to said hydrocracking zone from the effluent thereof only materials boiling above about 200° F.

Further in accordance with the present invention, there is provided a method of producing dienes, which comprises contacting a hydrocarbon distillate feed boiling within the range from about 160° to 1050° F. and hydrogen in a first reaction zone in the presence of a catalyst comprising a hydrogenating-dehydrogenating component on an active cracking support at a temperature from 400° to 900° F., a pressure from 500 to 3500 p.s.i.g., and a liquid hourly space velocity from 0.1 to 15, to produce an effluent comprising isobutane, normal butane, isopentane, normal pentane and higher boiling materials, separating a naphtha fraction boiling below about 200° F. from said effluent as a product, recycling substantially all materials in said effluent boiling above 200° F. to said first reaction zone, passing a material selected from the group consisting of normal butane and isopentane from said effluent to a second reaction zone, dehydrogenating said material in said second reaction zone in the presence of a dehydrogenation catalyst under dehydrogenation conditions to produce at least one diene, and recovering said diene from the effluent from said second reaction zone.

The drawing

The novel features of the present invention are set forth with particularity in the appended claims. The invention will best be understood and additional objects and advantages thereof will be apparent from the following description of an exemplary process for producing paraffins, isoparaffins, dienes and other products when read in connection with the accompanying drawing, which is a flow diagram showing a preferred arrangement of process units and flow paths for use in practicing the present invention.

Feed and feed preparation

The feed to the present process is a hydrocarbon distillate boiling within the range from about 160° to 1050° F. The feed may be, for example, any one or combination of the following: (a) petroleum distillates; (b) shale oil distillates; (c) coal tar distillates; and (d) raffinates from any conventional extraction, adsorption or similar process, including Udex extraction, $SO_2$ extraction, furfural extraction and silica gel adsorption. The most preferred feeds are the aforesaid raffinates and petroleum distillates, particularly paraffinic straight run distillates in the gas oil boiling range, for example, gas oils derived from Minas crude. It is highly preferred that the feeds contain at least 75 volume percent paraffins. The nitrogen content of the feeds should be below about 500 parts per million, and preferably below about 10 to 20 parts per million. In order to bring the nitrogen content of a nitrogen-containing feed within these ranges, a conventional hydrofining pretreating step may be used, although such a step may be unnecessary when processing Udex raffinates.

Referring now to the drawing, a feed of the aforesaid description is passed through line 1 to hydrocracking zone 2. All or a portion of the feed in line 1 may be diverted through line 1A to separation zone 3, which may be a conventional Udex extraction, $SO_2$ extraction, furfural extraction, molecular sieve separation or silica gel separation zone, if necessary to treat said feed or a portion thereof in zone 3 in accordance with the present invention. Alternatively, or in addition, zone 3 may be supplied through line 4 to produce a paraffinic raffinate which may be passed to hydrocracking zone through line 5.

From zone 3 an aromatic extract may be withdrawn through line 6 and, if desired, passed to reforming zone 7 for further processing therein. Reforming zone 7 is a valuable adjunct to the process comprehended by the present invention, particularly in that hydrogen produced in reforming zone 7 may be recycled through line 8 to aid in maintaining the entire system in hydrogen balance.

Hydrocracking zone

Hydrocracking zone 2 is supplied with a feed through line 1 as discussed above. Hydrogen for the hydrocracking and for any denitrification reactions that inherently may occur in zone 2 is supplied to that zone through line 9.

The catalyst employed in hydrocracking zone 2 is one wherein a material having hydrogenating-dehydrogenating activity is deposited or otherwise disposed on an active cracking catalyst support. The cracking component may comprise any one or more of such acidic materials as silica-alumina, silica-magnesia, silica-alumina-zirconia composites, alumina-boria, fluoridized or selenided composites, and the like, as well as various acid-treated clays and similar materials. Particularly preferred catalyst components are synthetically prepared silica-alumina compositions having a silica content in the range of from about 15 to 99% by weight and an alumina content of from about 1 to 85% by weight. The hydrogenating-dehydrogenating components of the catalyst can be selected from any one or more of the various groups V, VI, VII and VIII metals, as well as from the oxides and sulfides thereof, alone or together with promoters or stabilizers that may have by themselves small catalytic effect, representative materials being the oxides and sulfides of molybdenum, tungsten, vanadium, chromium, and the like, as well as of metals such as iron, nickel, cobalt, platinum and palladium. If desired, more than one hydrogenating-dehydrogenating component can be present and good results have been obtained with catalysts containing composites of two or more of the oxides of molybdenum, cobalt, nickel, chromium and zinc, and with mixtures of such oxides with fluorine. The amount of the hydrogenating-dehydrogenating components present can be varied within relatively wide limits of from about 0.5 to 30% preferably 0.5 to 15%, based on the weight of the entire catalyst. Within these limits, the amount of said component present should be sufficient to provide a reasonable catalyst on-stream period at required conversion levels, but preferably insufficient to effect substantial saturation of aromatics that may be present in the feed.

Zone 2 is supplied with at least 1500 s.c.f. of hydrogen per barrel of feed thereto. At least 500, and normally from about 1000 to 2000, s.c.f. of hydrogen are consumed in zone 2 per barrel of feed thereto that is converted to synthetic products, i.e., products boiling below the initial boiling point of the feed thereto. While operation of the process in an integrated manner can readily be accomplished in hydrogen balance, so that hydrogen supplied from extraneous sources need not be resorted to, extraneous hydrogen nevertheless may be supplied to zone 2 through line 11 if desired.

Hydrocracking zone 2 is operated at a temperature from 400° to 900° F., a pressure of 500 to 3500 p.s.i.g., preferably 1000 to 2000 p.s.i.g., and an LHSV from 0.1 to 15, preferably 0.1 to 5.0. Under these conditions, the feed is converted in amounts exceeding 20% per-pass to synthetic materials, i.e., materials boiling essentially below the initial boiling point of the feed. Said synthetic materials have a high content of isoparaffins. The reactions that occur in hydrocracking zone 2 include hydrocracking and isomerization, and result in cracking of the recycle $C_{10}$ polymers hereinafter discussed, cracking of the 200° F.+ recycle material hereinafter discussed, and isomerization of the cracked products to produce the desired high yields of isoparaffins as well as to produce such normal paraffins as normal butane and normal pentane, both of which are used to advantage in the present process as hereinafter discussed. When hydrocracking such feeds as paraffinic light gas oils and Udex raffinates with recycle 200° F.+ materials as hereinafter discussed, there is obtained more than 30 volume percent yield of isopentane and 50 volume percent yield of mixed butanes, all of which may be retained in the process and converted to more valuable products as hereinafter discussed.

The effluent from hydrocracking zone 2 is passed through line 10 to high pressure separator 15 from which a hydrogen stream is withdrawn, purified by conventional means if desired and recycled through line 16. The remaining materials from separator 15 are passed through line 17 to first distillation zone 18.

*First distillation zone and recycle therefrom*

First distillation zone 18 in practice may be a conventional group of separate distillation and/or other separation zones adapted to carry out the required separations to achieve the results shown and described herein. From first distillation zone 18, a hydrogen stream may be withdrawn and recycled through line 19 if desired; light hydrocarbon gases may be withdrawn through line 20; isobutane may be withdrawn through line 21 for any desired purpose. Through lines 22, 23 and 24 are passed normal butane, isopentane and normal pentane, respectively, to dehydrogenation zone 30. If desired, dehydrogenation zone 30 also may be supplied through line 25 with additional amounts of normal butane, isopentane, normal pentane and/or other feed stocks convertible in dehydrogenation zone 30 to butadiene and/or isoprene; for example, isoamylene is readily convertible in dehydrogenation zone 30 to isoprene. A 200° F.— naphtha stream, having a relatively high octane number, containing a large volume of isohexane, and being useful in gasoline blending, is withdrawn as a product through line 26.

200° F.+ materials are recycled from distillation zone 18 through line 27 to hydrocracking zone 2. The choice of the cut point for this recycle stream is quite important. Based on processing of hydrobates, raffinates and Arabian gas oils, the following correlation has been obtained between recycle cut point and weight percent yield of isopentane based on fresh feed, using extinction recycle of the portion boiling above the cut point selected.

| Recycle Cut Point | Yield of Isopentane, Wt. Percent of Fresh Feed, Extinction Recycle of Portion Boiling Above Cut Point |
|---|---|
| 80 | 0 |
| 100 | 10 |
| 156 | 26 |
| 205 | 35 |
| 260 | 26.8 |
| 325 | 14 |
| 380 | 7 |

From the foregoing example, it can be seen that isopentane yield is a maximum at a recycle cut point in the neighborhood of 200° F., or more precisely in the neighborhood of 205° F. The discovery of this criticality has led to an understanding that, with a lower cut point, there is generally an unacceptably high gas make during the reaction in hydrocracking zone 2 and, if the cut point is higher, the yield of the desired $C_4$ and $C_5$ constituents of the feed to the dehydrogenation zone is unacceptably low.

*Dehydrogenation zone*

Dehydrogenation zone 30 is a conventional dehydrogenation zone, employing any of a wide variety of known dehydrogenation catalysts of which the commercially available chromia on alumina catalyst, containing about 20 weight percent $Cr_2O_3$ is a typical and suitable embodiment. Operating conditions may include temperatures from about 950° to 1200° F., preferably 1000 to 1100° F., relatively low pressures, generally atmospheric or subatmospheric, and 0.5 to 2.1 volumes of charge per volume of catalyst per hour. In dehydrogenation zone 30, there are produced butenes, butadienes, pentenes and pentadienes, including piperylene and isoprene.

From dehydrogenation zone 30 hydrogen is recycled through line 31 to hydrocracking zone 2.

*Second distillation zone*

The remaining effluent from dehydrogenation zone 30 is passed through line 32 to second distillation zone 33. Second distillation zone 33 may be a conventional group of separate distillation and/or other separation zones adapted to carry out the required separations to achieve the results shown and described herein. From second distillation zone 33 hydrogen is recycled through line 34 to hydrocracking zone 2 and butenes are recycled through line 35 to dehydrogenation zone 30. Butadiene and isoprene are withdrawn through lines 36 and 37, respectively. Isopentenes, together with unreacted isopentane, is recycled through line 38 to dehydrogenation zone 30.

*Polymerization zone*

From second distillation zone 33, normal pentenes and/or normal pentadienes, including piperylene, are passed through line 39 to polymerization zone 40. The prior art has been concerned with the problem of piperylene formation in dehydrogenation reactions, particularly in processes for producing isoprene or butadiene, for several reasons, including: (1) the fact that there is no substantial commercial demand for piperylene as a chemical intermediate; (2) because of its gum-forming tendencies, it cannot be used as a gasoline-forming components; (3) its formation causes a loss of valuable charging stock. The prior art has attempted to solve this problem in several ways, for example: (1) by hydrogenating the piperylene to a mono-olefin, isomerizing the mono-olefin, and recycling the isomerized product to the dehydrogenation zone; and (2) by recycling the piperylene to the dehydrogenation reactor to build up therein the equilibrium concentration of piperylene. These attempts involve numerous disadvantages that are apparent to those skilled in the art, including the use of valuable space in the dehydrogenation zone for maintenance of an equilibrium concentration of a compound having little practical utility. In accordance with the present invention, the piperylene, other normal pentadienes and normal pentenes are polymerized in zone 40 to produce $C_{10}$ polymers, which are readily cracked in hydrocracking zone 2, where the $C_5$ components of the cracked product also are isomerized in large part, so that from the $C_{10}$ polymers there are obtained both $nC_5$ and $iC_5$ components which are highly desirable products of the hydrocracking reactions in zone 2. The normal pentenes passed through line 39 to polymerization zone 40 result in large part from the dehydrogenation of normal pentanes in dehydrogenation zone 30; those skilled in the art will recognize that heretofore it has generally been very undesirable in a butadiene and/or isoprene production process to pass normal pentanes to the dehydrogenation zone. Polymerization zone 40 is a conventional zone, for example, a bulk liquid acid polymerization zone supplied with liquid phosphoric acid through line 45. The acid may have a concentration of from about 117 to 122%. Polymerization zone 40 may be operated at a temperature of from about 175° to 300° F., a pressure of from about 200 to 1800 p.s.i.g., and a space velocity in excess of about 0.2 volume of hydrocarbon per volume of acid per hour. The effluent from polymerization zone 40 is passed through line 46 to acid-hydrocarbon settler 47, from which acid is recycled through line 48 and $C_{10}$ polymers are passed through line 49 to hydrocracking zone 2.

*Summary*

From the foregoing, it may be seen that the process of the present invention provides a very desirable method for converting a wide variety of charging stocks to butadiene and/or isoprene in good yields, with very high efficiency of stock utilization. The process solves a number of problems that have confronted the art, for example, the piperylene problem discussed heretofore. By careful observance of the critical cut point discussed above, yields of isopentane may be maximized. By integrated operation as discussed above, the process may be operated in hydrogen balance. By polymerization of normal pentenes and/or normal pentadienes, including piperylene, useless by-products of the process that heretofore have been discarded, considered as waste products, or diverted to uses having only minor value, are reconstituted into a valuable augmentation of the charge stock to the process.

Although only specific arrngements and modes of operation of the present invention have been described and illustrated, numerous changes can be made in those arrangements and modes without departing from the spirit of the invention, and all such changes that fall within the scope of the appended claims are intended to be embraced thereby.

We claim:

1. In a hydrocracking process wherein a hydrocarbon distillate feed boiling within the range from about 160° to 1050° F. and hydrogen are contacted in a hydrocracking zone in the presence of a catalyst comprising a hydrogenating-dehydrogenating component on an active cracking support at a temperature of from 400° to 900° F., a pressure from 500 to 2000 p.s.i.g. and a liquid hourly space velocity from 0.1 to 15 to produce paraffins and isoparaffins, the method of increasing the yield of said paraffins and isoparaffins which comprises selecting said feed from the group consisting of paraffinic raffinates and petroleum distillates containing at least 75 volume percent paraffins, said raffinates being further selected from raffinates from Udex extraction, $SO_2$ extraction, furfural extraction, molecular sieve separation and silica gel separation processes, and recycling to said hydrocracking zone from the effluent thereof only substantially all materials boiling above about 200° F.

2. A process as in claim 1, wherein at least one material selected from the group consisting of paraffins and isoparaffins from the effluent from said hydrocracking zone is dehydrogenated in a dehydrogenation zone.

3. A process as in claim 2, wherein said hydrocracking zone and said dehydrogenation zone are operated substantially in hydrogen balance.

4. The method of producing dienes, which comprises contacting a hydrocarbon distillate feed containing at least 75 volume percent paraffins boiling within the range from about 160° to 1050° F. and hydrogen in a first reaction zone in the presence of a catalyst comprising a hydrogenating-dehydrogenating component on an active cracking support at a temperature from 400° to 900° F., a pressure from 500 to 2000 p.s.i.g., and a liquid hourly space velocity from 0.1 to 15, to produce an effluent comprising isobutane, normal butane, isopentane, normal pentane and higher boiling materials, separating a naphtha fraction boiling below about 200° F. from said effluent as a product, recycling substantially all materials in said effluent boiling above about 200° F. to said first reaction zone, passing a material selected from the group consisting of normal butane and isopentane from said effluent to a second reaction zone, dehydrogenating said material in said second reaction zone in the presence of a dehydrogenation catalyst under dehydrogenation conditions to produce at least one diene, and recovering said diene from the effluent from said second reaction zone.

5. A process as in claim 4, wherein said material is isopentane and said diene is isoprene.

6. A process as in claim 4, wherein said material is normal butane and said diene is butadiene.

7. A process as in claim 4, wherein said material is a mixture comprising isopentane and normal butane and wherein both butadiene and isoprene are recovered from said second reaction zone.

8. A process as in claim 4, wherein at least one $C_5$ diene other than isoprene from the effluent from said second reaction zone is polymerized in a polymerization zone to produce a $C_{10}$ polymer, and said $C_{10}$ polymer is returned to said first reaction zone.

9. A process as in claim 4, wherein said second reaction zone is operated at about 950° to 1200° F. at a relatively low pressure, with a chromia-alumina catalyst.

10. A process as in claim 4, wherein substantially all of said normal butane, isopentane and normal pentane in said effluent is passed to said second reaction zone.

References Cited by the Examiner
UNITED STATES PATENTS

| | | | |
|---|---|---|---|
| 2,431,485 | 11/47 | Keeling | 208—71 |
| 2,627,495 | 2/53 | Lanning | 208—87 |
| 2,889,383 | 6/59 | Green | 260—680 |
| 2,985,696 | 5/61 | Magness | 260—680 |

ALPHONSO D. SULLIVAN, *Primary Examiner.*